US010635564B1

(12) United States Patent
Makarskyy et al.

(10) Patent No.: US 10,635,564 B1
(45) Date of Patent: *Apr. 28, 2020

(54) SYSTEM AND METHOD FOR EVALUATING APPLICATION PERFORMANCE

(71) Applicant: ALLSCRIPTS SOFTWARE, LLC, Chicago, IL (US)

(72) Inventors: Stanislav Makarskyy, Buffalo Grove, IL (US); Mark Gregory Plunkett, Libertyville, IL (US); Igor Chmil, Buffalo Grove, IL (US); Stephen E Smith, Richmond, VA (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/859,643

(22) Filed: Dec. 31, 2017

Related U.S. Application Data

(63) Continuation of application No. 14/588,089, filed on Dec. 31, 2014, now Pat. No. 9,886,364.

(51) Int. Cl.
*G06F 11/34* (2006.01)
(52) U.S. Cl.
CPC ................ *G06F 11/3409* (2013.01)
(58) Field of Classification Search
None
See application file for complete search history.

(56) References Cited

U.S. PATENT DOCUMENTS

| | | | |
|---|---|---|---|
| 8,260,757 B1 * | 9/2012 | Chatterjee | G06F 16/252 707/703 |
| 9,575,760 B2 * | 2/2017 | Kini | |
| 2006/0122876 A1 * | 6/2006 | Von Schweber | G06Q 10/10 705/7.32 |
| 2008/0201277 A1 * | 8/2008 | Ozdemir | G08B 13/19641 706/11 |
| 2014/0114839 A1 * | 4/2014 | Neuweg | G06Q 40/025 705/38 |
| 2015/0221048 A1 * | 8/2015 | Zenhausern | G06Q 50/14 705/26.5 |
| 2015/0363478 A1 * | 12/2015 | Haynes | G06F 16/26 707/625 |
| 2016/0180240 A1 * | 6/2016 | Majumdar | G06N 3/006 706/46 |
| 2016/0286207 A1 * | 9/2016 | Fang | H04N 13/341 |
| 2016/0321043 A1 * | 11/2016 | Pavlin | G06F 8/36 |

* cited by examiner

*Primary Examiner* — Tung S Lau
(74) *Attorney, Agent, or Firm* — Loza & Loza, LLP; Peter Zura

(57) ABSTRACT

A computer readable medium storing a computer program for providing a method for evaluating the performance of a software application, the computer program executable by at least one or the one or more processors. The computer program comprising a set of instructions for receiving an indication of the initiation of a workflow transaction in an Application, determining whether the workflow transaction is to be marked as a traceable transaction based on a Measurement Marker Algorithm, tracking the performance of operations executed for the workflow transaction, and storing raw Call Metrics based on the tracked performance in an Intermediate memory.

16 Claims, 4 Drawing Sheets

SYSTEM AND METHOD FOR EVALUATING APPLICATION PERFORMANCE

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates to computing devices. More specifically, the present invention relates to the evaluation of an application's performance.

Reliable application performance evaluation is important in any application's instrumentation subsystem. Without continuous performance metrics available, troubleshooting certain types of problems is becoming increasingly difficult, which may result in negative user experience and/or application unavailability.

One of the challenges related to evaluation an application's performance is a requirement that the action for measuring performance no affect overall system performance. There are currently multiple approaches to determining an application's performance, ranging from internal diagnostic stopwatch statements in code to $3^{rd}$ party services that evaluate user experience performance based on geographical location. Example approaches are:

User-based logging—all calls for given user (or set of users) are recorded. This approach provides a good picture of performance of selected set of users, but does not give a sufficient picture for the entire user base.

Across the board logging—all the calls are logged. Due to the impact on system performance, and a very large volume of data logged, this type of logging is forced to be turned off and, generally, only enabled for a short time for troubleshooting a particular problem.

'Black box logging'—usually a 3rd party service that is replicating live user behavior using a scripting mechanism. While providing a good picture from the prospective of a given user, it does not give an insight to the detailed performance of internal classes/component and across the user base due to vast differences in workflows. Additionally, presence of other factors, such as network latency reduces credibility of such measurements.

Therefore, there exists a need for an improved method and system for evaluating an application's performance. This and other needs are addressed by one or more aspects of the present invention.

SUMMARY OF THE INVENTION

The present invention includes many aspects and features. Moreover, while many aspects and features relate to, and are described in, the context of healthcare applications, the present invention is not limited to use only in this context, as will become apparent from the following summaries and detailed descriptions of aspects, features, and one or more embodiments of the present invention.

Accordingly, one aspect of the present invention relates to a computer readable medium storing a computer program for providing a method for evaluating the performance of a software application, the computer program executable by at least one or the one or more processors. The computer program comprising a set of instructions for receiving an indication of the initiation of a workflow transaction in an Application, determining whether the workflow transaction is to be marked as a traceable transaction based on a Measurement Marker Algorithm, tracking the performance of operations executed for the workflow transaction, and storing raw Call Metrics based on the tracked performance in an Intermediate memory.

In a feature of this aspect, periodically truncating the raw Call Metrics, aggregating the truncated Call Metrics for predefined intervals, and storing the aggregated Call Metrics in a permanent memory.

In another feature of this aspect, aggregating the Call Metrics is executed on a pre-defined schedule.

In another feature of this aspect, the predefined intervals include one or minute, hour and day.

In another feature of this aspect, executing the operations for the workflow transaction.

In another feature of this aspect, the raw Call Metrics are stored in the Intermediate memory for each operation executed for the workflow transaction.

Another aspect of the present invention relates to a system comprising one or more processors, and a computer readable medium storing a computer program for providing a method for evaluating the performance of a software application, the computer program executable by at least one or the one or more processors. The computer program comprising a set of instructions for receiving an indication of the initiation of a workflow transaction in an Application, determining whether the workflow transaction is to be marked as a traceable transaction based on a Measurement Marker Algorithm, tracking the performance of operations executed for the workflow transaction, and storing raw Call Metrics based on the tracked performance in an Intermediate memory.

In a feature of this aspect, periodically truncating the raw Call Metrics, aggregating the truncated Call Metrics for predefined intervals, and storing the aggregated Call Metrics in a permanent memory.

In another feature of this aspect, aggregating the Call Metrics is executed on a pre-defined schedule.

In another feature of this aspect, the predefined intervals include one or minute, hour and day.

In another feature of this aspect, executing the operations for the workflow transaction. In another feature of this aspect, the raw Call Metrics are stored in the Intermediate memory for each operation executed for the workflow transaction.

Another aspect of the present invention relates to a method for evaluating the performance of a software application executable by at least one or more processors. The method comprises receiving an indication of the initiation of a workflow transaction in an Application, determining whether the workflow transaction is to be marked as a traceable transaction based on a Measurement Marker Algorithm, tracking the performance of operations executed for the workflow transaction, and storing raw Call Metrics based on the tracked performance in an Intermediate memory.

In a feature of this aspect, periodically truncating the raw Call Metrics, aggregating the truncated Call Metrics for predefined intervals, and storing the aggregated Call Metrics in a permanent memory.

In another feature of this aspect, aggregating the Call Metrics is executed on a pre-defined schedule.

In another feature of this aspect, the predefined intervals include one or minute, hour and day.

In another feature of this aspect, executing the operations for the workflow transaction. In another feature of this aspect, the raw Call Metrics are stored in the Intermediate memory for each operation executed for the workflow transaction.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
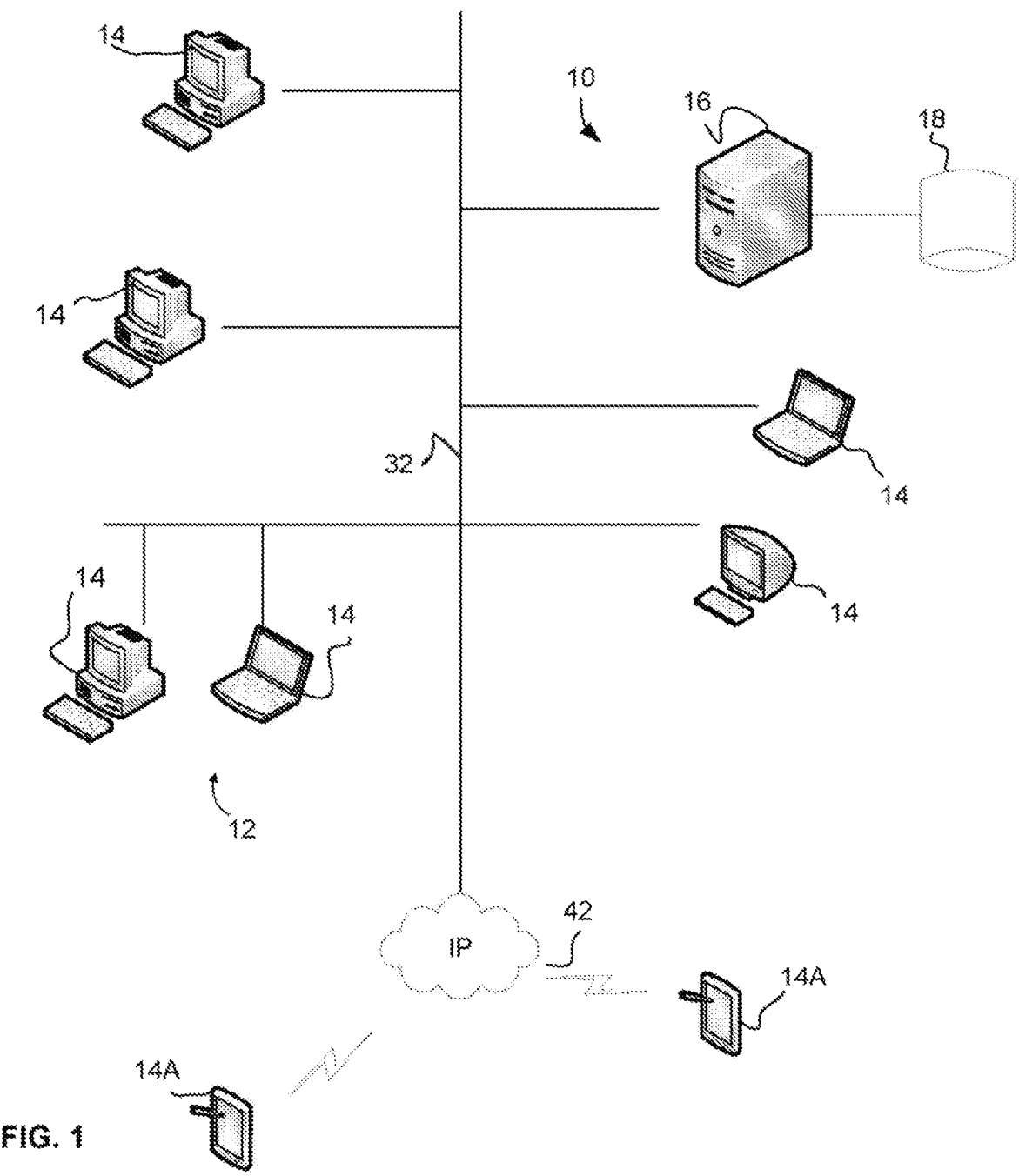
FIG. 1 is an example illustration of an environment in which an implementation of the disclosed evaluation system and method can be practiced.

Referring now to the drawings, one or more preferred embodiments of the present invention are next described. The following description of one or more preferred embodiments is merely exemplary in nature and is in no way intended to limit the invention, its implementations, or uses.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Referring to FIG. 1, a representative and non-limiting example of an environment in which an implementation of the disclosed system and method can be practiced is shown in block diagram format. In particular, FIG. 1 depicts a computerized healthcare system 10 that is used by clinicians (physicians, nurses and other medical personnel). The system is shown installed in a medical facility 12 indicated in dashed lines. The medical facility may for example be a hospital, nursing home, clinic, or other medical enterprise. The details on the medical enterprise and type of health care services is not particularly important.

The Healthcare system 10 includes a plurality of distributed workstations or client computers 14, a central server 16 and an electronic health record database 18 containing patient electronic health records (EHR). The workstations 14 could be for example general purpose computers with a processing unit and graphical display unit. The workstations 14 could also be hand-held computers. The workstations 14 include a memory storing an interactive, client-server based healthcare applications that are executed by the processor in the workstation. The applications provides user interface tools in the form of graphical screen displays, which allow the user access the electronic patient records stored in the database and add clinical documentation regarding a patient being treated at the facility 12, for example.

The health care facility may have a number of patient rooms, each of which may have a workstation 14. Additionally, physicians' offices 28 may also include workstations 14, in the form of personal computers. The workstations 14 are networked on a local area network 32 wherein all of the workstations may exchange data with the central database server 16 and thereby access the patient records stored in the database 18 and write documentation and orders, prescriptions, and other information to the database 18.

The network 32 may include a router (not shown) providing a connection to an internet service provider (ISP) 40 providing access to an external wide area internet protocol network 42 such as the Internet 42. A workstation 14A may be coupled to the enterprise network 32 via the ISP 40 whereby a clinician authorized to access the Healthcare system may do so via the Internet 42, ISP 40 network access server and local area network 32. Thus, a workstation 14, 14A accessing the Healthcare system 10 need not necessarily physically reside on the network 32 or be physically located within or at the enterprise 12.

Thus, the Healthcare system 10 that is installed in the medical facility 12 provides clinicians information they need, when and where they need it—at the point of care (e.g., in the patient rooms), in the offices 28, even at home via a computer 14A, mobile device 14A and the Internet 42.

In accordance with a preferred implementation, the disclosed evaluation system is a non-intrusive performance evaluation algorithm used to capture operations' durations by analyzing a set percentage of all calls traversing through given system components. An algorithm marks a transaction as traceable. Then all operations related to the transaction are logged to an intermediate storage and later aggregated to a predefined time interval. This stored information may later be used for performance trend analysis and hardware allocation planning purposes.

Figure 2:
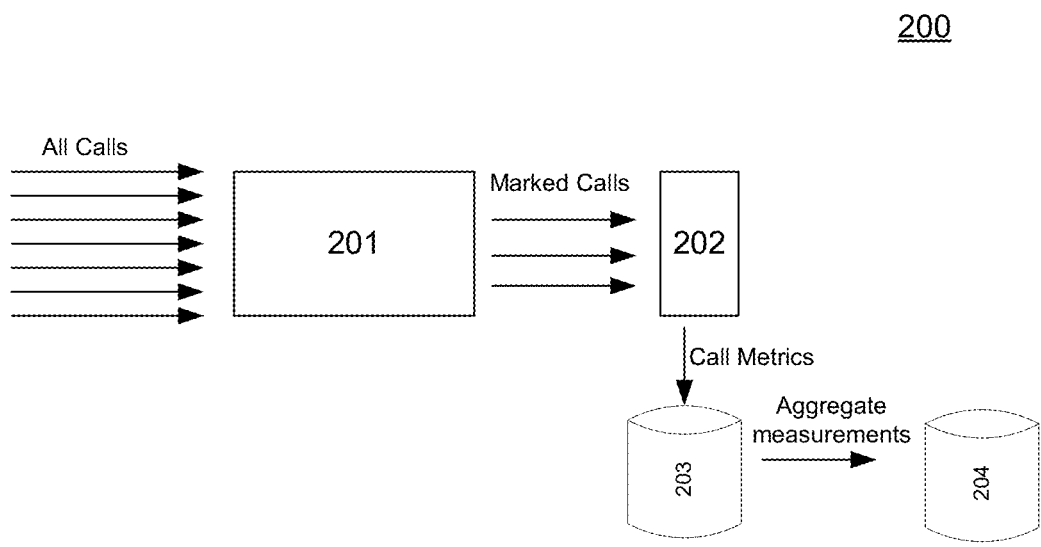
FIG. 2 is an example block diagram of the Evaluation system in accordance with a preferred embodiment of the present invention.

An example block diagram of the Evaluation system 200 is illustrated in FIG. 2. The Evaluation system 200 includes a Call Selector 201, Call Processing unit 202 and Intermediate memory 203. The Call Selector 201 receives a large number of Calls that are propagated through the system in an actively used application. Each call that is received by the Call Selector 201 is evaluated to determine whether the Call is to be marked as 'traceable'. If the Call is determined to be marked by the Call Selector 201, the Call is marked and forwarded to the Call Processing Unit 202.

In accordance with the disclosed implementation, the Call Selector 201 utilizes a Measure Marker algorithm to determine whether a Call is to be marked as traceable. The Measure Marker utilizes a Call Identifier associated with the Call and determines whether the Call Identifier falls within a specified percentage criteria. The percentage criteria may be defined by the System Administrator or be a preset value included in the Evaluation System. The Measure Marker algorithm allows the Evaluation System to evaluate the performance of a certain percentage of Calls that are propagated through the system. Examples of the Measurement Marker Algorithm include Global Unique Identifier (GUID) type Distribution and Integer type Distribution. Below are example code used by the Call Selector 201 for determining those Calls that are to be marked.

GUID Type Distribution:

```
/// <summary>
/// one of the approaches that can be used for marking transaction for performance
/// this approach assumes random/sequential GUID distribution
/// </summary>
/// <param name="tranId">Unique identifier of a transaction</param>
/// <param name="selectionCriteriaInPercent">what percentage all calls should be logged</param>
/// <returns></returns>
public static bool IsGuidTransactionSelectedForPerformanceMetrics(Guid tranId, int selectionCriteriaInPercent)
{
bool isSelected=false;
if (selectionCriteriaInPercent>0 && tranId !=Guid.Empty)
{
var noOfScriptToSelect=((255*selectionCriteriaInPercent)/100);
var firstByteInt=Convert.ToInt32(tranId.ToByteArray( ).First( ));
if (firstByteInt<noOfScriptToSelect)
{
isSelected=true;
}
}
return isSelected;
}
```

Integer Type Distribution:

```
/// <summary>
/// one of the approaches that can be used for marking transaction for performance
/// this approach assumes sequential id of a transaction that is integer
/// </summary>
/// <param name="tranId">Unique transaction id</param>
/// <param name="threshold">predefined logging threashold value</param>
/// <returns></returns>
public static bool IsIntTransactionSelectedForPerformanceMetrics(int tranId, PerformanceLoggingPercentageThreshold threshold)
{
switch (threshold)
{
case PerformanceLoggingPercentageThreshold.Off:
    return false;
case PerformanceLoggingPercentageThreshold.All:
    return true;
case PerformanceLoggingPercentageThreshold.One:
    return tranId % 100==0;
case PerformanceLoggingPercentageThreshold.Five:
    return tranId % 20==0;
case PerformanceLoggingPercentageThreshold.Ten:
    return tranId % 10==0;
case PerformanceLoggingPercentageThreshold.Twenty:
    return tranId % 5==0;
case PerformanceLoggingPercentageThreshold.TwentyFive:
    return tranId % 4==0;
case PerformanceLoggingPercentageThreshold.Fifty:
    return tranId % 2==0;
case PerformanceLoggingPercentageThreshold.SeventyFive:
    return tranId % 4 !=0;
case PerformanceLoggingPercentageThreshold.Eighty:
    return tranId % 5 !=0;
case PerformanceLoggingPercentageThreshold.Ninety:
    return tranId % 10 !=0;
}
return false;
}
public enum PerformanceLoggingPercentageThreshold
{
Off=0,
One=1,
Five=5,
Ten=10,
Twenty=20,
TwentyFive=25,
Fifty=50,
SeventyFive=75,
Eighty=80,
```

Ninety=90,
All=100
}

The marked Calls are forwarded to the Call Processing Unit 202 by the Call Selector 201 for processing and implementing each Call. It should be noted that all Calls are processed and executed by the Call Processing Unit 202, including those Calls that were not determined to be marked as Traceable. As each marked Call is executed, Call Metrics for each of these Calls is stored in the Intermediate memory 203. The Call Metrics may include metrics such as timing of the Call.

Figure 3:
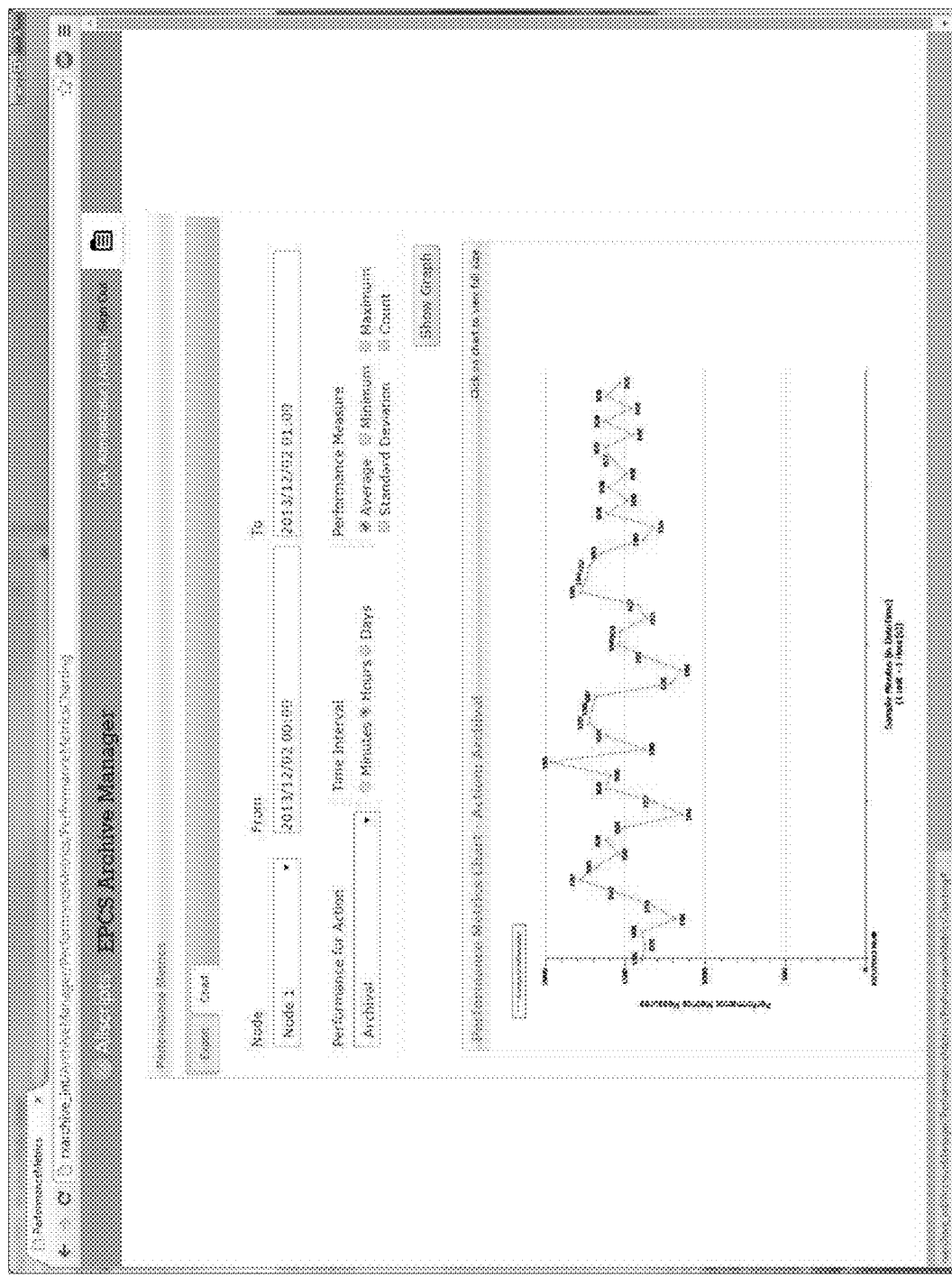
FIG. 3 is an example screenshot of an Application Performance Report generated in accordance with the disclosed implementation.

The Intermediate memory 203 is preferably an intermediate storage of the raw metrics that are periodically truncated. The raw Call Metrics stored in the Intermediate memory 203 are then aggregated for predefined intervals (e.g., minute, hour, day, etc.). The aggregated Call Metrics may be stored in a permanent storage device 204 for reviewing and reporting. An example screenshot of an Application Performance Report generated in accordance with the disclosed implementation are illustrated in FIG. 3. It is preferable that a standalone process is executed on a defined schedule that aggregates row values and truncates the temporarily stored raw data in the Intermediate memory 203.

Figure 4:
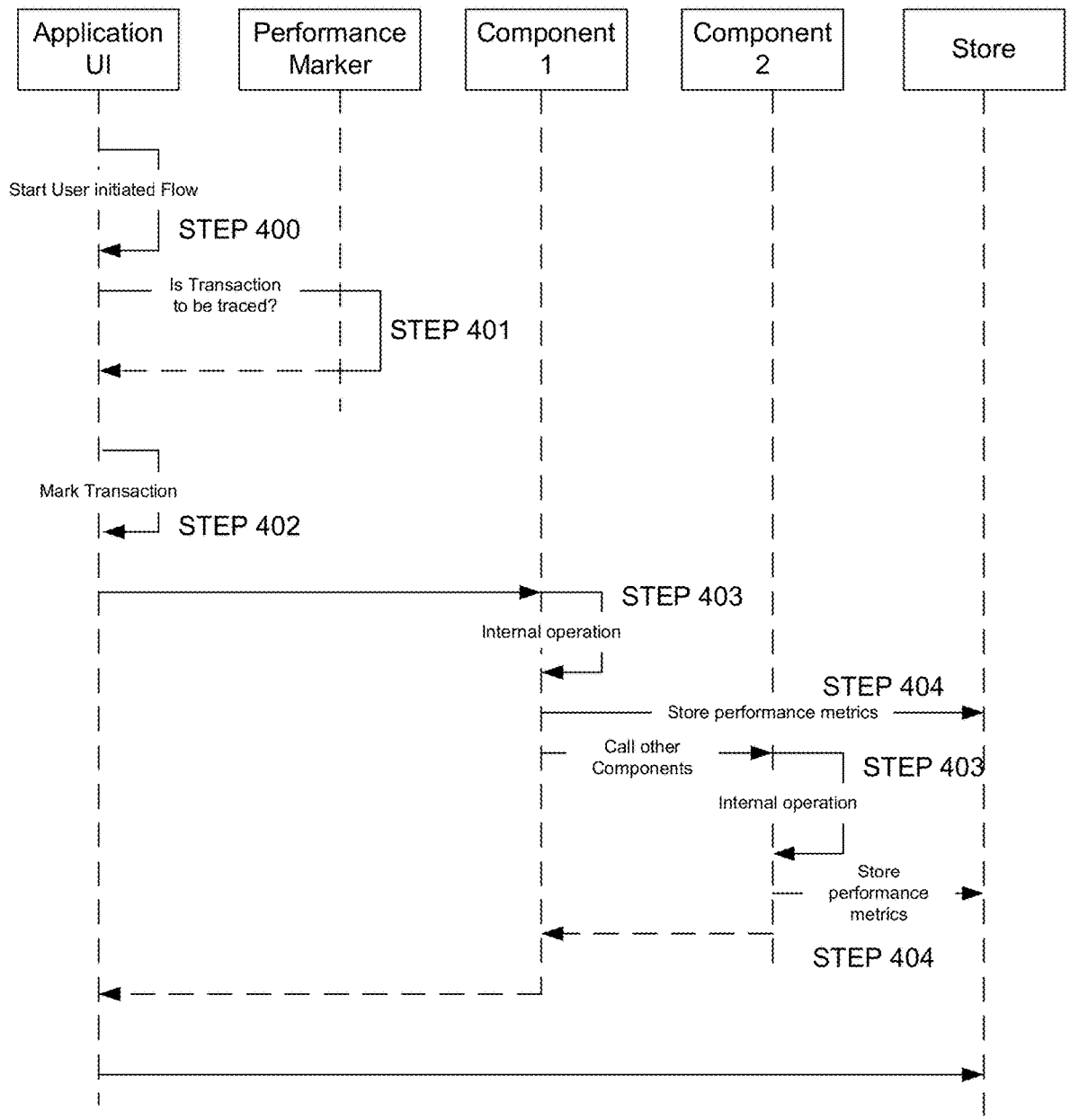
FIG. 4 is an example flow diagram of the evaluation system and method in accordance with the disclosed implementation of the present invention.

FIG. 4 is an example flow diagram of the method for evaluating the performance of a system application in accordance with disclosed implementation. A user initiates an application workflow in a healthcare system (STEP 400). A determination is made as to whether the workflow transaction is to be marked as traceable (STEP 401). If the transaction is to be marked, the transaction is marked (STEP 402) and an operation is executed (STEP 403). Performance metrics for the operation are stored (STEP 404).

The next operation is then performed (STEP 403) and performance metrics for the operation stored (STEP 404). This continues until all operations in the transaction have been performed.

The raw metrics being stored are then automatically aggregated at a predetermined time to a predefined interval (STEP 405).

Machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The disclosed system and methods are preferably implemented by software, hardware, or a combination of hardware and software. The disclosed implementations can include implementation in one or more computer programs that are executable and/or interpretable on a programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in an appropriate programming language. As used herein, the terms "machine-readable medium" "computer-readable medium" refers to any computer program product, apparatus and/or device (e.g., magnetic discs, optical disks, memory) used to provide machine instruction and/or data to a programmable processor. The computer readable medium can also be distributed over network-coupled computer systems so that the computer readable code is stored and executed in a distributed fashion.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method providing a technical solution to the technical problem of evaluating the performance of a software application without affecting overall system performance, the method comprising:
   (a) continuously receiving, at a call selector software component, software calls within a computer system each representing an indication of the initiation of a software workflow transaction having a unique transaction ID, and, for each respective received software call, utilizing a measurement marker algorithm comprising
      (i) comparing, for the respective software call, a first byte of its unique transaction ID to a threshold value calculated based on a predefined selection criteria percentage,
      (ii) determining, for the respective software call, whether the respective software call is to be marked as a traceable transaction based on the result of the comparison, and
         (A) if it is determined that the respective software call is to be marked as a traceable transaction, marking the respective software call as traceable, or if it is determined that the respective software call is not to be marked as a traceable transaction, not marking the respective software call as traceable, and
      (iii) forwarding the respective software call to a call processing software component,
      (iv) wherein
         (A) a first set of the received software calls are marked as traceable,
         (B) a second set of the received software calls are not marked as traceable, and
         (C) a ratio of a number of software calls in the first set to a number of software calls in the first and second sets corresponds to the predefined selection criteria percentage; and
   (b) receiving, at the call processing software component, the forwarded software calls, including the first set of received software calls and the second set of received software calls, and, for each respective forwarded software call, (i) determining, for the respective software call, whether the respective software call is marked as traceable, and (ii) effecting execution of one or more respective operations to execute the respective software call, and (A) if it was determined that the respective software call is marked as traceable, tracking the performance of the one or more respective operations executed for the respective forwarded software call representing an indication of the initiation of a software workflow transaction and storing call metrics based on the tracked performance of the one or more respective operations in an intermediate memory, or if it was not determined that the respective software call is marked as traceable, not tracking the performance of the one or more respective operations.

2. The method of claim 1, wherein the method further comprises periodically truncating the call metrics stored in the intermediate memory.

3. The method of claim 2, wherein the method further comprises aggregating the truncated call metrics for pre-defined intervals.

4. The method of claim 3, wherein the method further comprises storing the aggregated call metrics in a permanent memory.

5. The method of claim 3, wherein aggregating the call metrics is executed on a predefined schedule.

6. The method of claim 5, wherein the predefined schedule comprises pre-defined intervals defined in minutes.

7. The method of claim 5, wherein the predefined schedule comprises pre-defined intervals defined in hours.

8. The method of claim 5, wherein the predefined schedule comprises pre-defined intervals defined in days.

9. A method providing a technical solution to the technical problem of evaluating the performance of a software application without affecting overall system performance, the method comprising:

(a) continuously receiving, at a call selector software component, software calls within a computer system each representing an indication of the initiation of a software workflow transaction having a unique transaction ID, and, for each respective received software call, utilizing a measurement marker algorithm comprising (i) calculating a respective modulo value for the respective software call by performing a modulo operation dividing the unique transaction ID by a value determined based on a predefined selection criteria percentage, and (ii) determining, for the respective software call based on the respective modulo value, whether the respective software call is to be marked as a traceable transaction, and (A) if it is determined that the respective software call is to be marked as a traceable transaction, marking the respective software call as traceable, or if it is determined that the respective software call is not to be marked as a traceable transaction, not marking the respective software call as traceable, and (iii) forwarding the respective software call to a call processing software component, (iv) wherein (A) a first set of the received software calls are marked as traceable, (B) a second set of the received software calls are not marked as traceable, and (C) a ratio of a number of software calls in the first set to a number of software calls in the first and second sets corresponds to the predefined selection criteria percentage; and (b) receiving, at the call processing software component, the forwarded software calls, including the first set of received software calls and the second set of received software calls, and, for each respective forwarded software call, (i) determining, for the respective software call, whether the respective software call is marked as traceable, and (ii) effecting execution of one or more respective operations to execute the respective software call, and (A) if it was determined that the respective software call is marked as traceable, tracking the performance of the one or more respective operations executed for the respective forwarded software call representing an indication of the initiation of a software workflow transaction and storing call metrics based on the tracked performance of the one or more respective operations in an intermediate memory, or if it was not determined that the respective software call is marked as traceable, not tracking the performance of the one or more respective operations.

10. The method of claim 9, wherein the method further comprises periodically truncating the call metrics stored in the intermediate memory.

11. The method of claim 10, wherein the method further comprises aggregating the truncated call metrics for pre-defined intervals.

12. The method of claim 11, wherein the method further comprises storing the aggregated call metrics in a permanent memory.

13. The method of claim 11, wherein aggregating the call metrics is executed on a predefined schedule.

14. The method of claim 13, wherein the predefined schedule comprises pre-defined intervals defined in minutes.

15. The method of claim 13, wherein the predefined schedule comprises pre-defined intervals defined in hours.

16. The method of claim 13, wherein the predefined schedule comprises pre-defined intervals defined in days.

* * * * *